Sept. 16, 1941. A. SZERENYI ET AL 2,256,329
METHOD OF MAKING FOOTWEAR
Original Filed Jan. 7, 1937
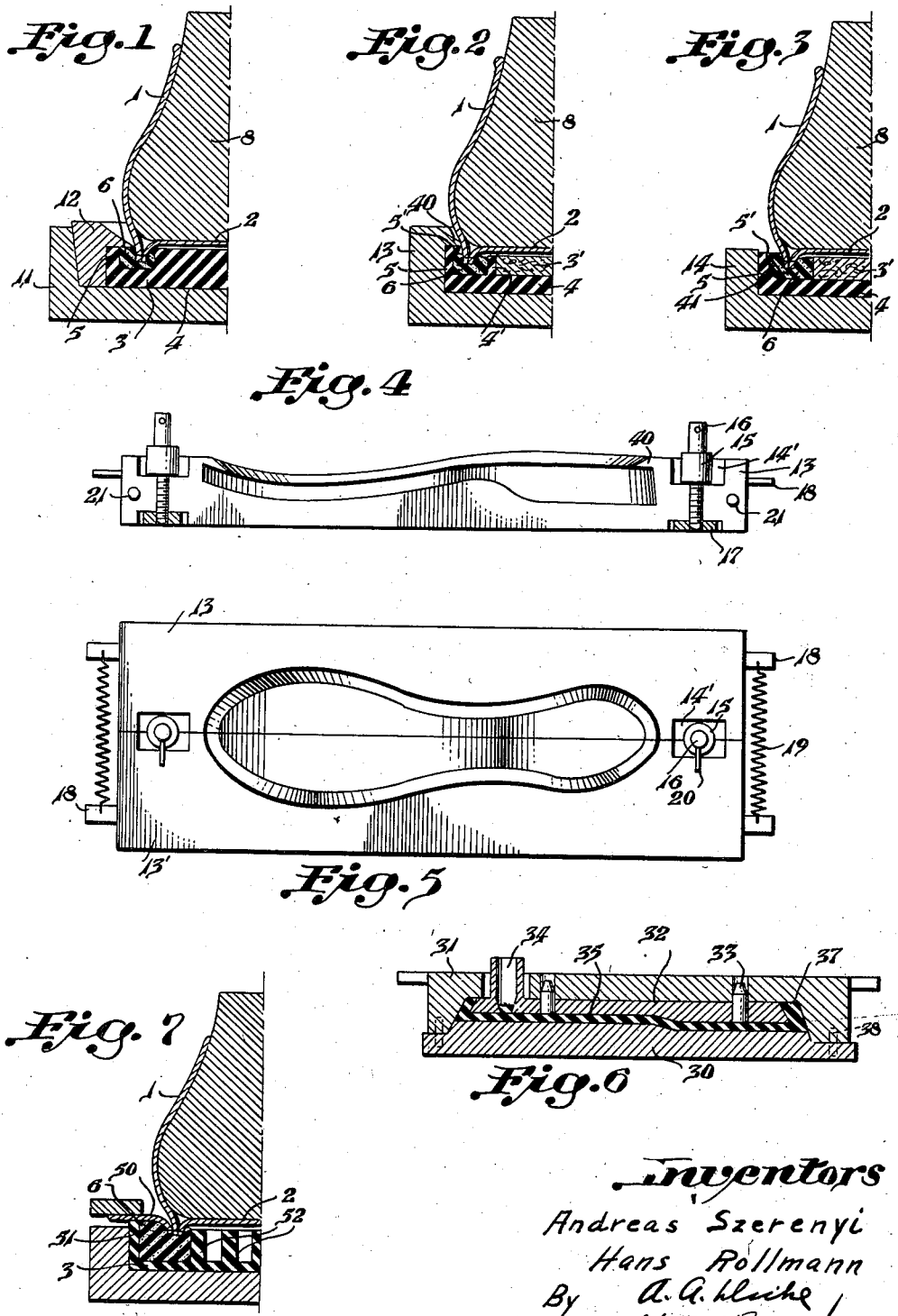

Patented Sept. 16, 1941

2,256,329

UNITED STATES PATENT OFFICE 2,256,329

METHOD OF MAKING FOOTWEAR

Andreas Szerenyi and Hans Rollmann, Brussels, Belgium, assignors, by mesne assignments, to Heinz Rollmann, Brussels, Belgium Original application January 7, 1937, Serial No. 119,511. Divided and this application August 9, 1938, Serial No. 223,864. In Austria January 8, 1936

7 Claims. (Cl. 18—59)

This application is a division of our application for Letters Patent Ser. No. 119,511, filed January 7, 1937, now Patent No. 2,129,106, for "Footwear."

The invention relates to footwear such as boots, shoes or slippers provided with rubber soles and has for an object the provision of a method of making a new type of sole partly consisting of sponge rubber, porous or cellular rubber, which sole is comfortable, resistant against wear and tear, firmly connected to the upper, and inexpensive to produce.

Sponge rubber, whether of the macrocellular or microcellular type, and produced from rubber compositions including an inflating agent or from whipped rubber latex, has repeatedly been suggested as a material for making rubber soles, as it is more pliable and resilient, and less heavy, than dense rubber; but such rubber soles offer little resistance against wear and tear, and moisture, and also cause certain manufacturing difficulties.

To cover the tread of the sole with a sheet of dense rubber is only a partial remedy, and covering the exposed surfaces of a sponge rubber sole with a thin film of non-porous rubber is still less satisfactory, as such a film wears away very soon.

It is, of course, possible and has already been suggested to enclose a sponge rubber sole entirely by dense rubber so as to protect the latter effectively, but such compound soles are rather difficult and expensive to produce and still more difficult to attach securely to the upper, particularly if the latter consists of a soft textile material. Sewing on, or pasting on with rubber cement are unsatisfactory while connecting by means of vulcanization requires a very high pressure and expensive machinery.

According to the present invention these difficulties are overcome by using a body of sponge rubber as—preferably exclusive—means for connecting, by vulcanization or otherwise, a hard-wearing, substantial outer sole consisting of dense rubber, and an upper, the body of sponge rubber being located in a recess or cavity provided in the upper face of the outer sole and thereby protected from detrimental external influences.

As sponge rubber unites much more easily and securely than dense rubber with such materials as are used for uppers, only a modest pressure, or, in certain cases, no pressure at all, is required in the vulcanizing step, and this fact facilitates the manufacture considerably. The sole will be found to be extremely durable and resistant to wear and tear, moisture and other influences, and the fact that the connection between the sole and the upper is resilient to a certain, but limited extent increases the comfort of the wearer.

The shape of the recess or cavity provided in the upper face of the dense rubber sole may vary widely, the only indispensable feature being that the recess must underlie all such portions of the upper, or of parts connected with the upper, which need immediate connection with the sole.

The recess may be shaped as a groove in the upper face of the dense rubber sole and correspond approximately to the outline of the edge of the upper, or of a welt or fastening strip sewn onto or otherwise connected with the upper. The portion of the dense rubber sole extending outwardly from the outer side wall of the recess will remain visible on the finished boot or shoe and form an outer vertical and an upper horizontal, marginal surface of the sole, both surfaces being highly resistant to wear and tear and protecting the sponge rubber body effectively.

The outer edges of the recess may be undercut, leaving a tongue, which may be bevelled or not, and which may reach as far as, or even touch, the upper without being immediately connected therewith. Such a tongue will prevent any sponge rubber mass from penetrating too far, and disfiguring the shoe, during the vulcanizing step. The outer side wall of the recess, the tongue, or both of them, may be stiffened by lateral reinforcing bridges of dense rubber forming part of the dense rubber outer sole.

The portion of the upper face of the outer sole surrounded by the groove may be provided with an additional recess to be filled with more sponge rubber, or with a filler of felt or the like; or there may be a single recess having an outer side wall corresponding to the outline of the upper, but no inner sidewall at all, in which case the dense rubber part of the sole will be found to consist of a tread portion and a substantial rib surrounding its margin, the upper surface of the rib forming the eventually visible upper horizontal surface or margin of the sole. Furthermore, if the rib is undercut to produce a horizontal tongue as explained above, the dense rubber portion of the sole assumes the shape of a hollow shell comprising a tread portion, and a vertical side portion which is turned over horizontally and inwardly at its upper end.

The invention, and the mode of carrying it out in practice, are further explained, by way of example only, in connection with the accompanying drawing, where Fig. 1 is a diagrammatical cross section of a shoe assembled in a mould and undergoing vulcanization, Fig. 2 is a similar section of a modified shoe, Fig. 3 is a similar section of still another modification, Fig. 4 is an elevation of one-half of, and Fig. 5 is a plan view, of a vulcanizing mould for carrying out the present invention.

Fig. 6 is a longitudinal section of a casting mould for shaping soles, and

Fig. 7 is a cross section similar to that shown in Fig. 1, regarding a further modification of the shoe according to the present invention.

The upper 1 (Fig. 1) shown on a last 8 may consist of a suitable textile material and is provided with an insole 2 and assembled above and pressed against a metal frame 12 arranged in a mould 11. This mould also contains a dense rubber sole 3 shaped and, if desired, partly vulcanized in a previous stage and having a marginal groove 6 filled with a rubber sponge mix. During the vulcanization step this mix is prevented from escaping laterally by the rib 5 of the rubber sole, and from escaping in an upward direction by the frame 12. When assembling, the dense rubber sole is first put into the mould, then the frame is fitted over it and the groove in the sole filled with the sponge rubber composition, whereupon the upper, to which the insole 2 has been sewn, is slipped over the last and the latter pressed against the frame. The mould is then subjected to vulcanizing heat for a suitable period, and the shoe emerging from the mould will be found flawless, not requiring any finishing touch.

In order to reduce the weight of the dense rubber sole, the portion thereof underlying the insole 2 may be provided with further recesses (Fig. 2), space being thus afforded for filler 3' to be arranged above the tread portion of the sole. This filler, or intermediate sole, which may consist of felt or of some other soft and yielding material, may be separated from the sponge rubber body 6 by a rib 4' of the dense rubber sole formed when provisionally shaping the sole in preliminary step. Or the filler may be in contact with the sponge rubber body as shown in Fig. 3, or it may even itself consist of sponge rubber. Where ventilation of the insole is desired, rows or a net of ribs 52 (Fig. 7) may be provided in a recessed middle portion of the sole, thus safeguarding ample ventilation.

As indicated in Figs. 2 and 3, the sole may advantageously comprise not only a dense rubber side portion 5, but also a dense rubber horizontal or marginal portion or tongue 5'. In such a case the space containing the sponge rubber mix is effectively kept closed during the vulcanizing step by the upper being pressed against the edge of the dense rubber tongue, particularly, if the tongue terminates in a sharp edge. It depends on the shape and thickness of the dense rubber rib whether it should be supported during the vulcanizing step by a ledge 40 (Fig. 2) of the vulcanizing frame, or may be left unsupported (Fig. 3).

The dense rubber sole, when shaped as a hollow shell, may be stiffened by enlarged edges or by supporting ribs or bridges 41. The sole shown in Fig. 3 is provided with both types of reinforcements, and the vulcanizing frame 14 may therefore be left open on top.

In any case the dense rubber portion of the sole should be thick and strong enough to resist considerable wear and tear and a minimum thickness of $\frac{1}{32}''$, preferably one of $\frac{1}{16}''$, is recommended.

The vulcanizing mould shown in Figs. 4 and 5 consists of parts 13, 13 fitted together along a joint coinciding with the longitudinal axis of the shoe. Recesses 14 provided in the parts 13, 13 are adapted to receive the centering bolts 16, which are held in position by shoulders 15 and engage counterparts, e. g. nuts 17. The bolts 16 may be used for centering the last as well as for securing it in the correct position. At the end faces of the mould springs 19 on lugs 18 force the parts 13, 13 against each other, while registering pins 21 safeguard their correct mutual position.

The portion of the mould surrounding the sole is provided with a special metal edge 12, against which the upper is tightly pressed by the last.

The dense rubber sole may be shaped by pressing in a separate heatable mold. The body of sponge rubber may be produced by introducing into the mould, more particularly into the recess or cavity provided in the upper face of the dense rubber sole, some unvulcanized rubber composition containing an inflating agent such as sodium bicarbonate, or some latex froth obtained by whipping rubber latex, or foam rubber, or combinations or mixtures of any of these materials. All these various methods of producing sponge rubber or cellular or porous rubber are well known to those skilled in the art, and their description need not be reiterated here.

In certain cases it is recommendable also to shape the dense rubber sole, from rubber latex, for instance by dipping or spraying. According to one modification of the present invention latex is poured into a mould corresponding to the shape of the finished sole, and after a shell-shaped body of rubber has been deposited and grown to the desired thickness on the inside walls of the mould by coagulation, the excess of liquid latex is poured out. The dense rubber sole shell thus formed may, without removing it from the mould, be filled with latex froth.

In many cases the vulcanizing mould holding the dense rubber sole or sole shell may itself be used for shaping the latter. This is also true if the complete sole is produced from rubber by pressing in a heated mould, (in which case the part of the mould shaping the inner side of the sole must, naturally, be removed before introducing the sponge rubber mix and attaching the upper), but it applies particularly if the sole is made from latex.

If the dense rubber sole shell is made from rubber latex not in the vulcanizing mould itself, but in a separate mould, the rubber shell is removed therefrom after drying, placed in the vulcanizing mould, filled with latex froth and then put on top of the upper. In such cases vulcanization, or setting, may even be obtained in the open air without applying pressure, and special vulcanizing moulds corresponding to the desired shape of the sole may be dispensed with altogether.

For shaping a dense rubber sole shell out of rubber latex a mould such as shown in Fig. 6 will be found advantageous. It comprises a base plate 30, a cover plate 31, guided by registering pins 38, and between the two plates there is a core portion 32 provided with registering pins 33 and a filling hole 34. Rubber latex is poured in through 34 and forms the tread portion 35 of the sole as well as its marginal rib 37, i. e., the complete dense rubber sole shell. As soon as the rubber body is dry the mould may be dismantled and after removing the casting pipe corresponding to the filling hole, the sole shell may be filled with a sponge rubber composition and connected to the upper.

In order to keep the space to be filled by sponge rubber closed during the vulcanizing step, a welt or fastening strip 50 made of dense rubber or of textile material may be secured to the edge of the upper end turned over and outward so as to cover the outer upper rim of the dense rubber sole 3, against which it is forced by a suitably shaped part of the vulcanizing frame. Eventually, this strip 50, firmly secured to the sponge rubber body by vulcanization, forms the upper and approximately horizontal marginal surface of the finished sole.

In accordance with a further feature of the present invention it is of special importance that the sponge or froth rubber parts of any type of footwear should have a pore volume of not more than 75 per cent of the total volume, and not less than 25 per cent. It is surprising to note that really satisfactory sponge rubber parts of footwear are obtained only within this rather restricted range. A smaller pore volume than 25 per cent is objectionable because the strength of the material is poor in relation to the increased weight and rubber consumption, and the diminished resiliency. To exceed the upper limit of 75 per cent, is still more unsatisfactory as then a lack of stability makes itself felt which is sometimes described as a "floating of the foot on the sole."

As a result of further investigation in connection with the present invention we have also been able to ascertain that it is highly advantageous to use rubber compositions of a particularly high degree of plasticity for making sponge rubber or froth rubber parts serving as connecting means of any type of boots, shoes or footwear in general.

The plasticity of rubber is usually measured by means of a plasto-meter according to Scott. Smooth sheets having a thickness of 10 mm. are stored for 24 hours. Circular samples having a diameter of 40 mm. are then cut from such sheets, preheated at 80° C. for 40 minutes and then placed in the apparatus which is also preheated and loaded with 10 lbs. The thickness of the sample decreases gradually at a rate depending on the plasticity, and is measured five times at intervals of 1 minute by means of a micrometer screw. The sum total of these five readings represents the plasticity number which ranges, in the case of the usual rubber compositions, between 15 and 25. The rubber compositions used in accordance with the present invention should be of a much higher degree of plasticity corresponding to a much lower plasticity number. The number should not be higher than 7, and numbers between 3 and 5 are preferred.

The plasticity numbers may vary with the actual measuring conditions and unit employed, but the relation between them will be found to remain approximately unaltered. While we have hereinabove described several illustrative examples of the methods employed in carrying out our invention, it is to be understood that they are to be regarded merely as illustrative and that we do not intend to limit ourselves thereto, except as may be required by the following claims.

We claim:

1. The method of making rubber soled footwear, comprising shaping a dense rubber outer sole with a recess corresponding in outline approximately to that of the upper, filling said recess with a sponge rubber mix, assembling the sole thus prepared with an upper so that the upper projects into said recess, and heating it to a vulcanising temperature so as to produce a body of sponge rubber vulcanised onto said upper and onto said dense rubber sole and serving their exclusive connecting means.

2. The method of making rubber-soled footwear comprising shaping and partly vulcanizing a dense rubber outer sole provided with a recess corresponding in outline approximately to that of the upper, filling said recess with a sponge rubber mix, assembling the sole thus prepared with an upper so that the upper projects into said recess, and heating it to a vulcanizing temperature so as to complete the vulcanization of the dense rubber outer sole and to produce a body of sponge rubber vulcanized on to said upper and said dense rubber sole and serving as their exclusive connecting means.

3. The method of making rubber-soled footwear comprising shaping a dense rubber sole shell with a cavity, filling its cavity with a sponge rubber mix containing latex froth, assembling it with an upper so that the upper projects into the cavity of the sole shell, and vulcanizing the rubber parts without pressure in the open air.

4. The method of making rubber-soled footwear comprising shaping a dense rubber outer sole with a recess corresponding in outline approximately to that of the upper, filling said recess with a quantity of sponge rubber mix adjusted to yield, on expansion, a sponge rubber body having a pore volume ranging between 25 and 75 per cent of its total volume, assembling the sole thus prepared with an upper so that the upper projects into said recess, and heating it to a vulcanizing temperature so as to produce a body of sponge rubber vulcanized onto said upper and onto said dense rubber sole and serving as their exclusive connecting means.

5. The method of making rubber-soled footwear comprising shaping a dense rubber outer sole with a recess corresponding in outline approximately to that of the upper, filling said recess with a sponge rubber mix of a composition to yield, on vulcanization, a sponge rubber body of a very high plasticity which, when measured with Scott's plastometer, gives readings below 7 under conditions where usual rubber compositions give readings above 14, assembling the sole thus prepared with an upper so that the upper projects into said recess, and heating it to a vulcanizing temperature so as to produce a body of sponge rubber vulcanized on to said upper and on to said dense rubber sole and serving as their exclusive connecting means.

6. The method of making rubber sole footwear comprising forming a dense rubber outer sole having a tread face, a edge face and an upper face the latter face having a recess corresponding in outline approximately to that of an upper to be attached thereto, said sole being formed in a mould having surfaces forming the tread and edge faces, partly vulcanizing said sole while in said mould, filling said recess with a sponge rubber mix, so assembling an upper to the sole thus prepared while remaining in said mould that the upper engages with the sponge rubber mix in said recess and applying vulcanizing heat so as to complete the vulcanization of the dense rubber sole and simultaneously to produce a mass of sponge rubber vulcanized to said upper and to said dense rubber sole and serving as their exclusive connecting means.

7. The method of making rubber soled footwear, comprising shaping a dense rubber outer sole with a recess corresponding in outline approximately to that of the upper, filling said recess with a sponge rubber mix, assembling the sole thus prepared with an upper so that the upper engages with said sponge rubber mix in said recess, and heating to a vulcanizing temperature so as to produce a body of sponge rubber vulcanized onto said upper and onto said dense rubber sole and serving as their exclusive connecting means.

ANDREAS SZERENYI.
HANS ROLLMANN.